(12) United States Patent
Kruger et al.

(10) Patent No.: US 8,452,789 B2
(45) Date of Patent: May 28, 2013

(54) SEARCHING A DATABASE

(75) Inventors: Stephen Paul Kruger, Malahide (IE); Padraig O'Dowd, Clonee (IE)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 12/251,068

(22) Filed: Oct. 14, 2008

(65) Prior Publication Data
US 2009/0150384 A1 Jun. 11, 2009

(30) Foreign Application Priority Data
Oct. 15, 2007 (EP) .................................. 07118435

(51) Int. Cl.
G06F 7/00 (2006.01)
G06F 17/30 (2006.01)

(52) U.S. Cl.
USPC ........................................................ 707/758

(58) Field of Classification Search
USPC ........................... 707/758, 600, 706, 707, 723
See application file for complete search history.

(56) References Cited

U.S. PATENT DOCUMENTS

| | | | |
|---|---|---|---|
| 7,725,469 B2 * | 5/2010 | Colgrave et al. | 707/736 |
| 7,725,482 B2 * | 5/2010 | Smith et al. | 707/759 |
| 7,783,656 B2 * | 8/2010 | Colgrave et al. | 707/760 |
| 7,792,959 B2 * | 9/2010 | Kind et al. | 709/224 |
| 7,844,612 B2 * | 11/2010 | Colgrave et al. | 707/754 |
| 7,853,961 B2 * | 12/2010 | Nori et al. | 719/328 |
| 7,966,320 B2 * | 6/2011 | Roshen | 707/723 |
| 7,996,394 B2 * | 8/2011 | Roshen | 707/723 |
| 8,005,879 B2 * | 8/2011 | Bornhoevd et al. | 707/899 |
| 8,041,722 B2 * | 10/2011 | Seager et al. | 707/754 |
| 8,117,553 B2 * | 2/2012 | Danninger et al. | 715/764 |
| 8,161,055 B2 * | 4/2012 | Seager et al. | 707/754 |
| 2004/0064554 A1 * | 4/2004 | Kuno et al. | 709/225 |
| 2004/0078424 A1 * | 4/2004 | Yairi et al. | 709/203 |
| 2004/0213409 A1 * | 10/2004 | Murto et al. | 380/258 |
| 2005/0114306 A1 * | 5/2005 | Shu et al. | 707/3 |
| 2005/0165656 A1 * | 7/2005 | Frederick et al. | 705/26 |
| 2005/0257162 A1 * | 11/2005 | Danninger et al. | 715/764 |
| 2006/0004764 A1 * | 1/2006 | Kurhekar et al. | 707/10 |
| 2006/0074876 A1 * | 4/2006 | Kakivaya et al. | 707/3 |
| 2006/0149756 A1 * | 7/2006 | Walker | 707/100 |
| 2007/0118560 A1 * | 5/2007 | Bornhoevd et al. | 707/104.1 |
| 2007/0219976 A1 * | 9/2007 | Muralidhar et al. | 707/4 |
| 2009/0055366 A1 * | 2/2009 | Smith et al. | 707/4 |
| 2009/0055367 A1 * | 2/2009 | Colgrave et al. | 707/4 |
| 2009/0055410 A1 * | 2/2009 | Colgrave et al. | 707/100 |
| 2009/0055432 A1 * | 2/2009 | Smith et al. | 707/103 R |
| 2009/0083239 A1 * | 3/2009 | Colgrave et al. | 707/4 |
| 2009/0150384 A1 * | 6/2009 | Kruger et al. | 707/5 |
| 2009/0177768 A1 * | 7/2009 | Kind et al. | 709/224 |
| 2009/0216884 A1 * | 8/2009 | Larvet | 709/226 |
| 2010/0017387 A1 * | 1/2010 | Roshen | 707/5 |

(Continued)

*Primary Examiner* — Robert Beausoliel, Jr.
*Assistant Examiner* — Nicholas Allen
(74) *Attorney, Agent, or Firm* — Holland & Knight LLP; Brian J. Colandreo, Esq.; Jeffrey T. Placker, Esq.

(57) ABSTRACT

A method of searching a database is disclosed, in which the database comprises a plurality of components and respective descriptions, such as a UDDI database of web services and associated descriptions. The method includes transmitting a query to the database, receiving a response from the database, the response comprising a plurality of components, accessing one or more service requirements relating to the transmitted query, matching the service requirements to the respective descriptions of the plurality of components of the response, and ranking the components in the response according to an output associated with the matching.

18 Claims, 6 Drawing Sheets

U.S. PATENT DOCUMENTS

| | | | |
|---|---|---|---|
| 2010/0017405 A1* | 1/2010 | Roshen | 707/6 |
| 2010/0030734 A1* | 2/2010 | Chunilal | 707/3 |
| 2010/0043050 A1* | 2/2010 | Nadalin et al. | 726/1 |
| 2010/0082619 A1* | 4/2010 | Seager et al. | 707/732 |
| 2010/0088324 A1* | 4/2010 | Seager et al. | 707/754 |
| 2010/0100525 A1* | 4/2010 | Huang | 707/609 |

* cited by examiner

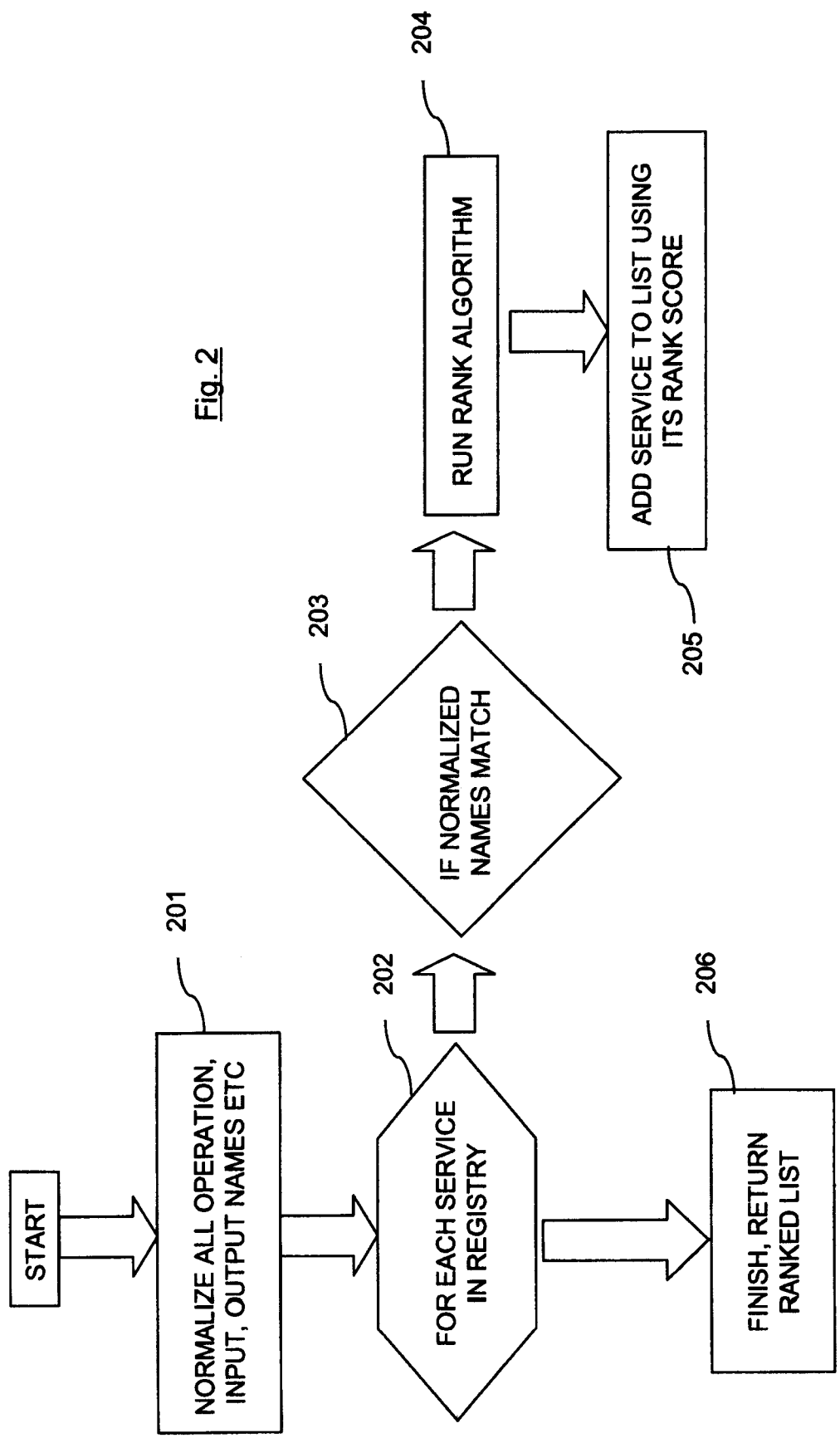

SEARCHING A DATABASE

RELATED APPLICATIONS

This application claims the benefit of European Patent Application Number 07118435.2 filed on 15 Oct. 2007, the entire contents of which are herein incorporated by reference.

TECHNICAL FIELD

This invention relates to a method of and system for searching a database. In one embodiment, the invention provides a method for improving automatic selection of services during composite application authoring by ranking results to service registry searches.

BACKGROUND

Using computing systems to search resources such as databases and websites is a common occurrence. For example, commercial organisations such as Google provide an interface that can be accessed via the Internet that allows users to input one or more words or phrases to search for matching websites. Google operates a very large processing function running algorithms to process the requests that are input via their web interfaces.

With the advent of technologies such as UDDI, (Universal Description, Discovery and Integration, see www.uddi.org) it is also possible to search for business services. UDDI is a protocol which creates a standard interoperable platform that enables companies and applications to quickly, easily, and dynamically find and use Web services over the Internet. UDDI is a cross-industry effort driven by major platform and software providers, as well as marketplace operators and e-business leaders. It allows users to search for specific functions (web services) and provides information about the technical structure of the services offered. UDDI essentially provides users with a "yellow pages" of web services that are available. For example, if a user wishes to find a web service that provides the ability to search for images, then the user can query a UDDI node for such web services, and receive back a list of providers of this specific type of search function, with respective descriptions about such detail as cost, structure of inputs and outputs and so on.

However, all known services such as UDDI do not provide to the user a set of results that is in anyway formatted to provide information on which service(s) is/are the most suitable for the user's specific application.

Thus it would be desirable to alleviate the above problems.

SUMMARY OF THE DISCLOSURE

According to a first aspect of the present invention, there is provided a method of searching a database, the database comprising a plurality of components and respective descriptions, the method comprising: transmitting a query to the database, receiving a response from the database, the response comprising a plurality of components, accessing one or more service requirements relating to the transmitted query, matching the service requirements to the respective descriptions of the plurality of components of the response, ranking the components in the response according to an output associated with the matching, and presenting a result according to the output of the ranking.

According to a second aspect of the present invention, there is provided a system for searching a database, comprising a database, the database comprising a plurality of components and respective descriptions, and a processing function arranged to transmit a query to the database, to receive a response from the database, the response comprising a plurality of components, to access one or more service requirements relating to the query, to match the service requirements to the respective descriptions of the plurality of components of the response, to rank the components in the response according to an output associated with the matching.

According to a third aspect of the present invention, there is provided a computer program product loadable into the internal memory of a digital computer, comprising software code portions for performing, when said product is run on a computer, to carry out the invention as described above.

Owing to the invention, it is possible to reduce the complexity involved in orchestrating web services into composite applications to allow non-technical users to easily create composite applications. Authoring composite applications is limited to users skilled in the art of programming and is not readily accessible to knowledge workers. This invention reduces the difficulty involved in selecting suitable web services for use in an overall application. This allows users to easily create such composite applications.

Current solutions for orchestrating web services focus on providing graphical tools for visually mapping inputs to outputs, but assume the author is skilled in the art of mapping complex object types and parameters between the participating web services. This invention extends the functionality of existing service repositories (such as UDDI or WSRR) to allow more focused searches to be conducted which return only results relevant to the current operation in the authoring process. These constraints can be applied by a predefined set of rules, which are applied during the comparison of the current service, and the list of services returned by a regular services registry search, to allow an intelligent ranking of the search results, and possibly guaranteeing an automatic mapping between the two services without further user intervention.

The basis of the invention is an interaction between a user, through a computing function, with a database of components (such as web services). The user may send a query to the database and receives a response. The query may include one or more service requirements. These service requirements may comprise input and output conditions of a desired component, either explicitly or codified into rules. Essentially the matches to the search query are further processed to create a ranked list of possible results. This further processing may take place either at the database side, at the user side, or be split between the two. In the latter case, the query may contain service requirements about the input side of the desired component, which results in a response from the database to the user that is then further filtered at the user's client device and ranked according to the desired requirements on the output side of the desired component.

Ranking the components in the response according to the output of the matching may comprise generating a score for each component in the response. Presenting a result according to the output of the ranking may comprise presenting a predefined number of components from the response, ordered according to their score.

BRIEF DESCRIPTION OF THE DRAWINGS

Embodiments of the present invention will now be described, by way of example only, with reference to the accompanying drawings, in which:

FIG. 2 is a flowchart of a method of searching the database;

DETAILED DESCRIPTION OF THE PREFERRED EMBODIMENTS

Figure 1:
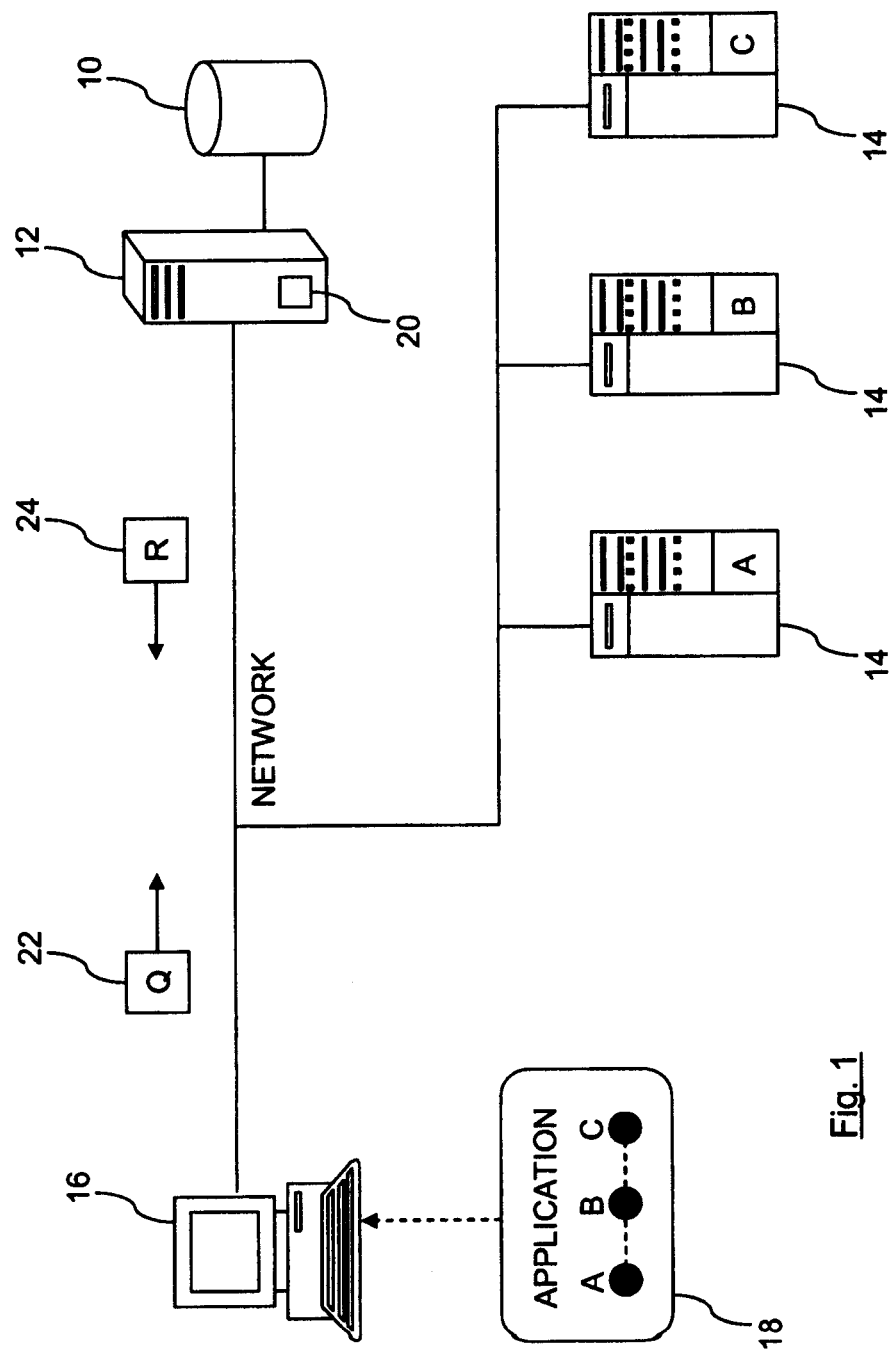
FIG. 1 is a schematic diagram of a system for searching a database.

A system for searching a database 10 is shown in FIG. 1. The system includes the database 10, which comprises a plurality of components and respective descriptions. The database 10 is accessed through a server 12. Multiple web servers 14 are connected to the server 12, and these servers publish details of their services to the server 12, which are then stored by the database 10. The components within the database 10 are the identities of the web servers 14, and the respective descriptions associated with each component are the details of the services, as defined by the specific standard implementing the database 10.

The implementation shown in this Figure describes a scenario using a particular instantiation of a services registry (WSRR), but is not limited to this usage. A user has access to a computer 16, which is embodying a processing function. In building composite applications 18, users require a pallet of services for forming the building blocks of their applications. Typical authoring mechanisms employ a services registry to provide a basic service discovery functionality, and allow searching on common attributes such as name, description, author, location etc. The main problem with such an implementation is that registry searches may return large numbers of services, and the user has no easy or automated way to rank these results and decide which one requires the least integration effort to include in the composite application.

This system of FIG. 1 uses an extension to the standard WSRR architecture, in the form of a plugin 20, which takes two additional parameters for the registry search. The user is sending a query 22 to the database 10 and receiving back a response 24. In the system shown in the Figure, it is assumed that the user is authoring a composite application 18 that is comprised of three separate services A, B and C. The methodology described below is applicable at the original authoring of the application 18, and also at any time in the future, when, for example, it may be desired to change the service B to a new service. In the description below, the user is wishing to find a service B, which will provide a specific desired function. The service B takes the output of web service A, and provides that output to service C.

The two additional parameters included with the query 22 are firstly, a service descriptor for the service to which the user wishes to map the new service (e.g. a WSDL definition). This service descriptor will be introspected to expose all of the output parameters for the current operation (as well as their types) and optionally documentation about the parameters. This information is then used for analysis by a specified rule set. The second parameter is a reference to a configurable rule set which defines how input and output parameters are to be mapped. Rule sets may consider for example: regular text expression matching (case sensitive/insensitive matches, wildcard matches etc), grammatical normalisation matches (e.g. matching "phone" with "telephone", "name" with "names", geographical localisation equivalence checking (e.g. matching "zipcode" with "postcode", and permissible type casts (e.g. xsd:int can map to xsd:long)

When a query 22 is made to the service registry 12, it will return zero or more parameters matching the search criteria. The registry 12 then iterates through each result as follows:

1. Extract the input parameters for each defined operation within the service description.
2. Identify and resolve the type definition for each of the input parameters.
3. Apply the specified rule set to the output parameters of the current web service, with the input parameters of the registry search result service.
4. The rule will then assign a particular score rank on how well the service criteria maps to the original webservice. This score will later be used when displaying a ranked list of matches for the initial service registry enquiry.
5. The rule will return an optimised mapping indicating the best fit scenario for the two services being compared, for later use should the binding be made.

The rules engine functionality attempts to assign an overall score to the overall parameter suitability using various comparison criteria. For the purposes of this embodiment, two such criteria, spatial equivalence, and morphological equivalence, will be used to illustrate how service requirements relating to the query can be matched to descriptions of components within the database 10.

Spatial compatibility: An implementation of morphological evaluation could for example evaluate the total number of parameters being compared, along with their defined types. Consider for example an output parameter with the structure:

```
OutputService1
    os1_param1[xsd:string]
    os1_param2[xsd:int]
and two input service candidates:
InputService1
    is1_param1[xsd:string]
    is1_param2[xsd:int]
InputService2
    is2_param1[xsd:int]
    is2_param2[xsd:string]
```

A rule implementation might be written to assign InputService1 a higher score given the fact that the parameters are typed in a morphologically more similar manner to the OutputService1 structure. Additional methods may be employed, such as comparing total parameter count, or attributing varying levels of precedence depending on the order of the parameters.

Morphological compatibility: Another method for ranking compatibility could be comparing normalised parameter names. One could for example define mappings for a particular domain (e.g. telephone numbers), and apply normalisation rules for equality. For example, "phone"="telephone"="contact #", and "zipcode"="post code". These examples are by no means exhaustive, and only serve to illustrate typical usage of such a scoring system. Each rule mechanism will apply an additive score to the overall rating of the candidate service, which will eventually be integrated with the original service registry search result to provide the final ordering of the returned results.

Closer to the user interface, an implementation might use this ranking to automatically bind the input and output parameters as per the mapping obtained from the rule comparison. Alternatively the user interface might simply display a ranked list of results, and allow the user to manually edit and audit the suggested mappings.

FIG. 2 summarises the operation of the plugin 20, after a query has been received. This can be considered as an algorithm named findTargetService. The inputs to this algorithm are the name of a target service, the outputs from the current service operation, and normalization rules (Besides basic normalization rules, users can also specify their own custom rules for example zipcode=postcode). The output of the algorithm is a ranked list (A data structure that allows key, value pairs—can have multiple values with the same key. Where value is the target operation and the key is its score.) The list is sorted with the target services with the lowest (best) scores first. The code for this algorithm is as follows:

```
normalize the target web service operation name (201)
for each operation in each WSDL file in the registry (202)
    compare its normalized name to the target service name (203)
    if there is a match run RANK algorithm (204)
    add to ranked list using score as key (205)
return ranked list (206)
```

Figure 3A:
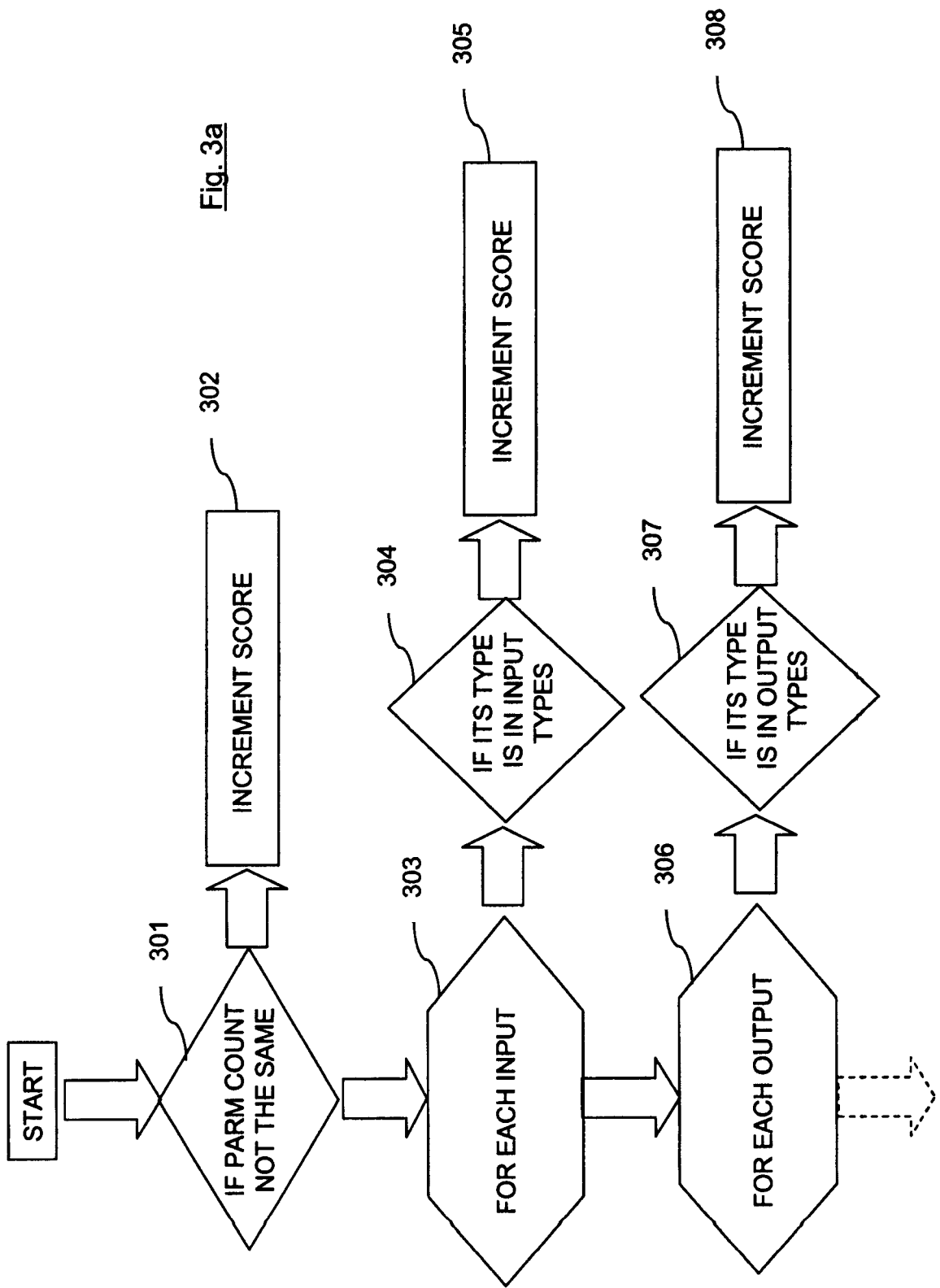
FIG. 3 is a flowchart of the operation of a ranking algorithm.
Figure 3B:
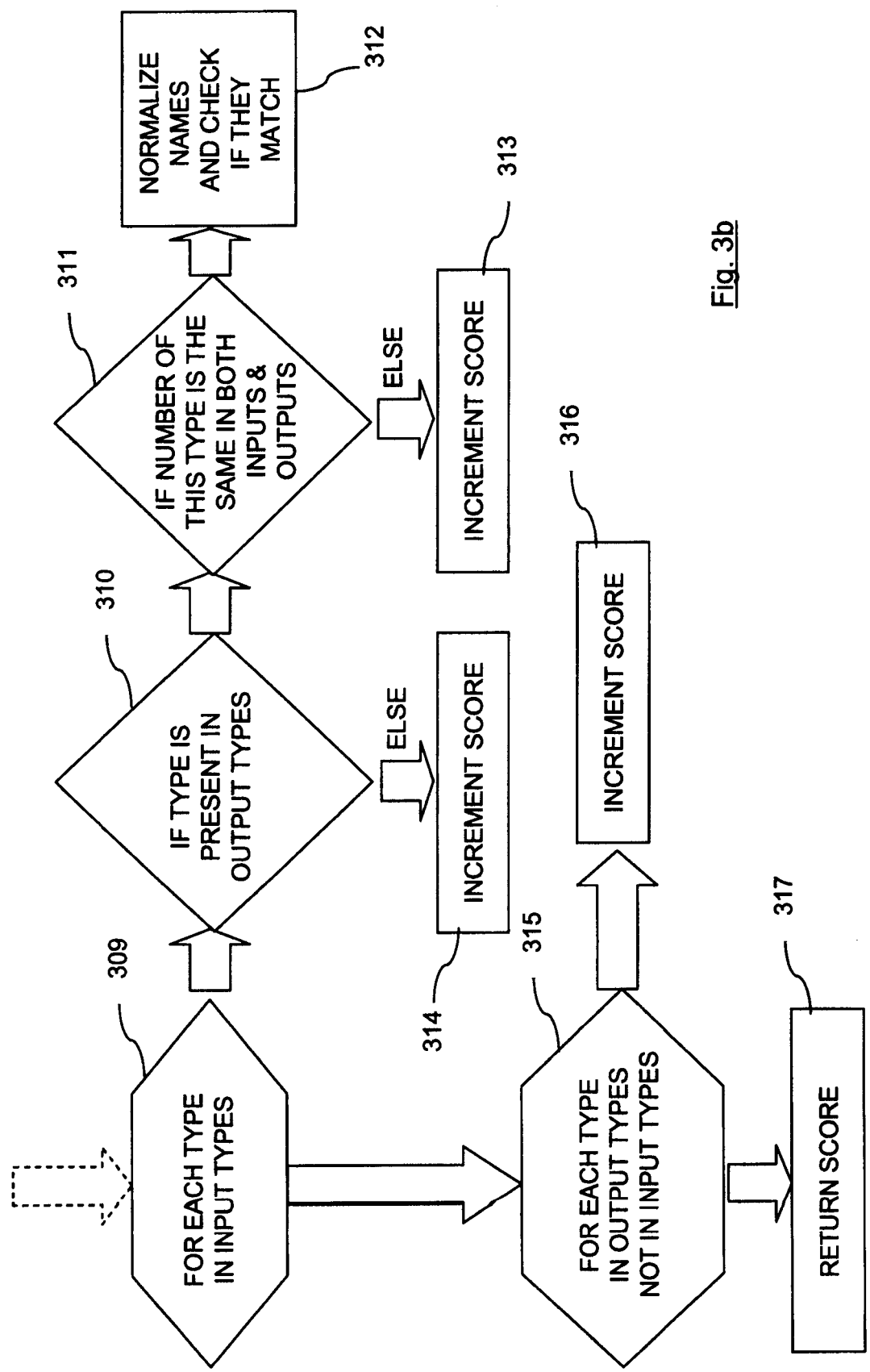

The algorithm rank mentioned in the above algorithm find-TargetService is shown in FIG. 3. The inputs for this algorithm are the inputs from the target service operation, the outputs from the original service operation, and the normalization rules. The single output is a score. The code for this algorithm is as follows:

```
if parameter count is the same between inputs and outputs (301)
    score = 0; else score = 1 (302)
map inputTypes, outputTypes;
for each input (303)
    if its type is in inputTypes (304)
        increment value by 1; (305)
    else add to inputTypes the type as the key and 1 as the value
for each output (306)
    if its type is in outputTypes (307)
        increment value by 1; (308)
    else add to outputTypes the type as the key and 1 as the value
for each type in inputTypes (309)
    if type is present in outputTypes (310)
        if number of this type is the same in both inputs and
            outputs (311)
            List names: list of normalized names of outputs with this
                type for each name of this type in inputs normalize
                name and see if it matches a name in the list: if it does
                remove matching entry from names else
                score += 1; (312)
        else score = 5 * difference between the number this type
            in inputTypes and outputTypes (313)
    else
    {
        score += 5 * number of this type in inputTypes; (314)
        //Type not present in output types
    }
for each type in outputTypes not in inputTypes (315)
    score += 5 * number of this type in outputTypes; (316)
return score (317)
```

This algorithm describes a scoring system to see how good two services are for a mapping to be made from one to the other (A->B). The lower the score that is returned at the end of the algorithm, then better the match between the two services. The algorithm basically compares the inputs and outputs of the respective services (the outputs of A with the inputs of B) to see how similar they are. These data structures A and B maintain lists of the types and number of these types in the inputs and outputs. For example, if there were the following inputs for B of: int a, int b, int c, String d, then inputTypes map would be:

| Key | Value |
|---|---|
| int | 3 |
| String | 1 |

If there were the following outputs for A of: String a, double b, String c, then outputTypes map would be:

| Key | Value |
|---|---|
| String | 2 |
| double | 1 |

In operations 303 to 305 of the flowchart of FIG. 3 and the algorithm above, If a type was String, for example, and String hadn't been already added to the map as a key (this means this is the first String input parameter), then there would be added "String" to the map as a key and 1 as the corresponding value. In relation to the qualifier attached to 314, this is just a comment added to say why the score was implemented in this else statement. If there was no matching type in the outputs for a specific type in the inputs, then the score is incremented (the lower the score at the end the better the match between the services). References in the algorithm to the "number of a type", simply means the number of times a particular type occurs in either the inputs or outputs, for example, as mentioned above, if there was the following inputs: int a, int b, int c, String d Then 'int' occurs three times and 'String' occurs once.

In the above embodiment of the invention, the processing of the search query is taking place on the server side of the system. That is, the query is being transmitted from the client device 16 to the server 12 and database 10, with the processing of the output of the database 10 being carried out by the plugin 20. The plugin 20 is operating the algorithms described above to effectively intelligently filter the result returned from the database 10. This filtered result is a ranked list of possible solutions that is then presented to the client device 16.

Figure 4:
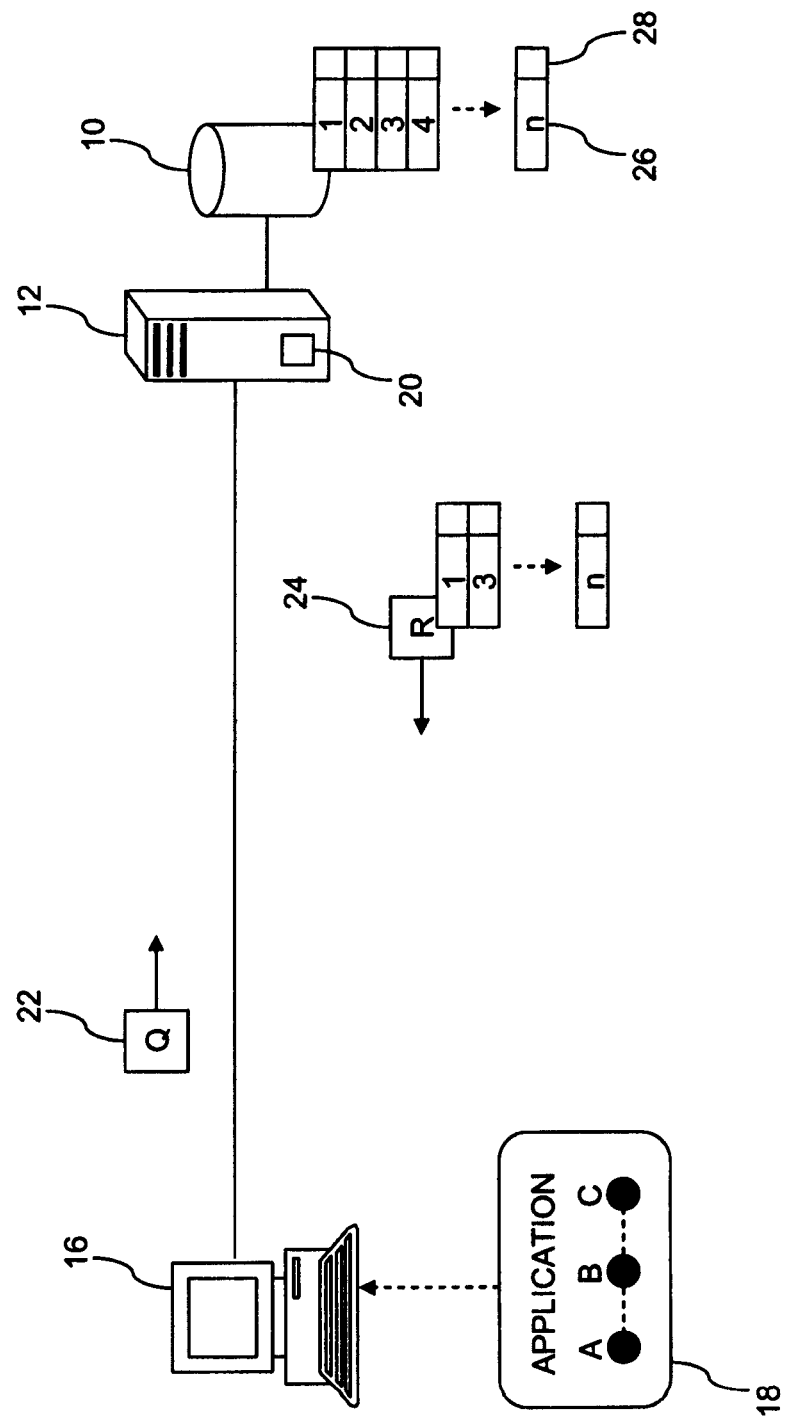
FIG. 4 is a schematic diagram of a second embodiment of the system for searching a database.

FIG. 4 shows a second embodiment of the system, whereby the filtering is taking place on the client side of the system. The database 10 comprises a plurality of components 26 and respective descriptions 28, such as web services and their respective technical descriptions. The processing function 16 is arranged to transmit the query 22 to the database 10, and to receive a response 24 from the database 10, the response 24 comprising a plurality of components 26 and descriptions 28. This is as per a standard querying of a UDDI node, whereby a user is making a request 22 for a list of specific services that match the query for the desired web service, in this case for the new service B. The client device 16 is querying the node 12, for example by asking for all web services that provide the functionality of being able to search the Internet for images. This is then returned to the device 16, as the response 24, which comprises a sub-list of components 26 and descriptions 28, taken from those stored in the database 10.

The processing function 16 is designed to access one or more service requirements relating to the query 22. In this case, the query 22 is for a replacement for the service B, so the service requirements are the outputs of A, and the inputs of B. For example, the output of service A may be a date range and a specific image tag format (using a suitable metadata standard for images), and the input for C may be a specific image format such as JPEG. The processing function 16, at this juncture, is arranged to match the service requirements to the respective descriptions 26 of the plurality of components 28 of the response 24. As discussed above, the service requirements may be codified as rules and may undergo semantic translation and/or be amended via user input to assist in the best matching. In the example above, the date range that is an output of the service A could be rendered in a number of different formats, and this could be encoded in a rule. The processing function 16 then processes and ranks the components 26 in the response 24 according to the output of the matching, and presents a result according to the output of the ranking. In the simplest form this result will be an ordered list of web services, with the most suitable at the top.

As mentioned above, the ranking of the components 26 in the response 24 according to the output of the matching can comprise generating a score for each component 26 in the response 24, using a predefined algorithm. The presenting of a result according to this output of the ranking would therefore comprise presenting a predefined number of components from the response, ordered according to their score. So each of the components 26 within the response 24 is scored according to its suitability for the function as the new web service B, based upon the known output requirements of A and input requirements of C. This is converted into a ranked list and presented to the user.

Figure 5:
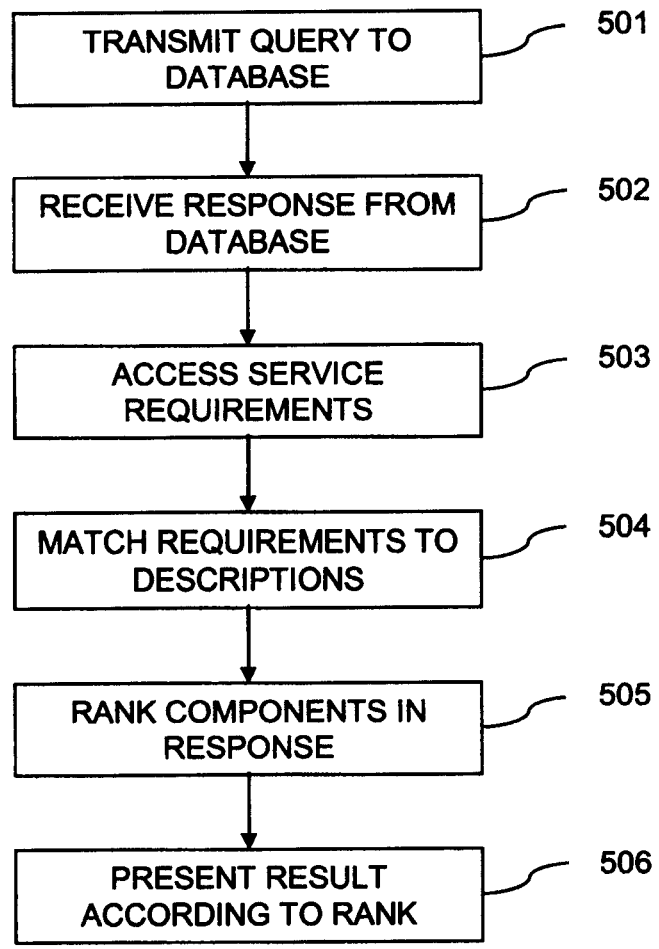
FIG. 5 is a flowchart of a summary of the method of searching the database.

FIG. 5 summarises the methodology executed by the embodiments of the system. The method comprises the steps of transmitting (501) the query 22 to the database 10, and then receiving (502) the response 24 from the database 10, the response 24 comprising a plurality of components 26. Depending upon the embodiment of the system, the response 24 is either received at the plugin 20, when the filtering occurs on the server side, or the response 24 is received at the computer 16.

In one embodiment, accessing one or more service requirements relating to the query 22 is performed (503). These service requirements may be present within the query 22 and used by the plugin 20, or may be available at the user end at the client device 16. The requirements are used to match (504) the service requirements to the respective descriptions 28 of the plurality of components 26 of the response 24, which may or may not include translation of the requirements to specific rules. Once the matching is completed, the components 26 may be ranked (505) in the response 24 according to the output of the matching, and presenting a result according to the output of the ranking (506).

Another implementation of such context related ranking of services could be used in a Bluetooth environment. Typically Bluetooth devices will publish a profile to a central registry indicating a set of capabilities and services offered by the device. If another device wishes to make use of a particular service, it can query the central profile registry to discover the set of registered profiles. Using a very similar method to the one described for a web services implementation, it is possible to match the list of published profiles for a best-fit match against a particular set of requirements which can be gained from the device being replaced. Since Bluetooth devices have a much more rigidly defined set of capability profiles defined (headset profile, file transfer profile, synchronisation profile) there is likely to be less variability in comparing input parameters and output parameters, and therefore will be able to deduce the validity of a mapping, and hence it's rank, with a large degree of certainty.

What is claimed is:

1. A method of searching a database, the database comprising a plurality of components and respective descriptions, the method comprising:

transmitting, via one or more computing devices, a query to the database, the query including one or more service requirements, the one or more service requirements including an input condition of a desired web service and an output condition of the desired web service;

receiving a response from the database, the response comprising a plurality of web services;

accessing the one or more service requirements, including the input condition of the desired web service and the output condition of the desired web service, relating to the transmitted query, comparing the accessed service requirements, including the input condition of the desired web service and the output condition of the desired web service, to one or more input conditions of the plurality of web services of the response and one or more output conditions of the plurality of web services of the response; and ranking the components in the response according to an output associated with the comparison, including generating a score for each component in the response, wherein generating the score includes comparing parameters of the service requirements to parameters of each of the components.

2. The method according to claim 1, further comprising presenting a result according to the output of the ranking and further comprising presenting a predefined number of components from the response, ordered according to their score.

3. The method according to claim 1, wherein each service requirement relating to the query comprises a rule derived from a service description of the query.

4. The method according to claim 1, wherein comparing the parameters of the service requirements to the parameters of the components includes comparing a number of parameters of the service requirements to a number of parameters of the components.

5. The method according to claim 1, wherein generating the score for each component in the response further comprises matching the input condition of the desired web service to one or more output conditions of the plurality of web services of the response, wherein the score is incremented if a match does not exist.

6. The method according to claim 5, wherein a lower generated score represents a better match between the desired web services.

7. A system for searching a database, comprising
a database operatively connected to one or more computing devices, the database comprising a plurality of components and respective descriptions, and a processing function arranged to:

transmit a query to the database, the query including one or more service requirements, the one or more service requirements including an input condition of a desired web service and an output condition of the desired web service;

receive a response from the database, the response comprising a plurality of web services;

access the one or more service requirements, including the input condition of the desired web service and the output condition of the desired web service, relating to the query;

compare the service requirements, including the input condition of the desired web service and the output condition of the desired web service, to one or more input conditions of the plurality of web services of the response and one or more output conditions of the plurality of web services of the response; and rank the components in the response according to an output of the comparison, including generating a score for each component in the response, wherein generating the score includes comparing parameters of the service requirements to parameters of each of the components.

8. The system according to claim 7, wherein the processing function is arranged, for presenting a result according to the output of the ranking, and presenting a predefined number of components from the response, ordered according to their score.

9. The system according to claim 7, wherein each service requirement relating to the query comprises a rule derived from a service description of the query.

10. The system according to claim 7, wherein comparing the parameters of the service requirements to the parameters of the components includes comparing a number of parameters of the service requirements to a number of parameters of the components.

11. The system according to claim 7, wherein generating the score for each component in the response further comprises matching the input condition of the desired web service to one or more output conditions of the plurality of web services of the response, wherein the score is incremented if a match does not exist.

12. The system according to claim 11, wherein a lower generated score represents a better match between the desired web services.

13. A computer readable storage medium having stored thereon instructions that when executed by a machine result in the following:
transmitting a query to the database, the query including one or more service requirements, the one or more service requirements including an input condition of a desired web service and an output condition of the desired web service;
receiving a response from the database, the response comprising a plurality of web services;
accessing the one or more service requirements, including the input condition of the desired web service and the output condition of the desired web service, relating to the transmitted query,
comparing the accessed service requirements, including the input condition of the desired web service and the output condition of the desired web service, to one or more input conditions of the plurality of web services of the response and one or more output conditions of the plurality of web services of the response; and
ranking the components in the response according to an output associated with the comparison, including generating a score for each component in the response, wherein generating the score includes comparing parameters of the service requirements to parameters of each of the components.

14. The computer readable storage medium of claim 13, wherein the instructions, when executed by the machine, further result in:
presenting a result according to the output of the ranking; and
presenting a predefined number of components from the response, ordered according to their score.

15. The method according to claim 13, wherein each service requirement relating to the query comprises a rule derived from a service description of the query.

16. The method according to claim 13, wherein comparing the parameters of the service requirements to the parameters of the components includes comparing a number of parameters of the service requirements to a number of parameters of the components.

17. The method according to claim 13, wherein generating the score for each component in the response further comprises matching the input condition of the desired web service to one or more output conditions of the plurality of web services of the response, wherein the score is incremented if a match does not exist.

18. The method according to claim 17, wherein a lower generated score represents a better match between the desired web services.

* * * * *